Figure 1:
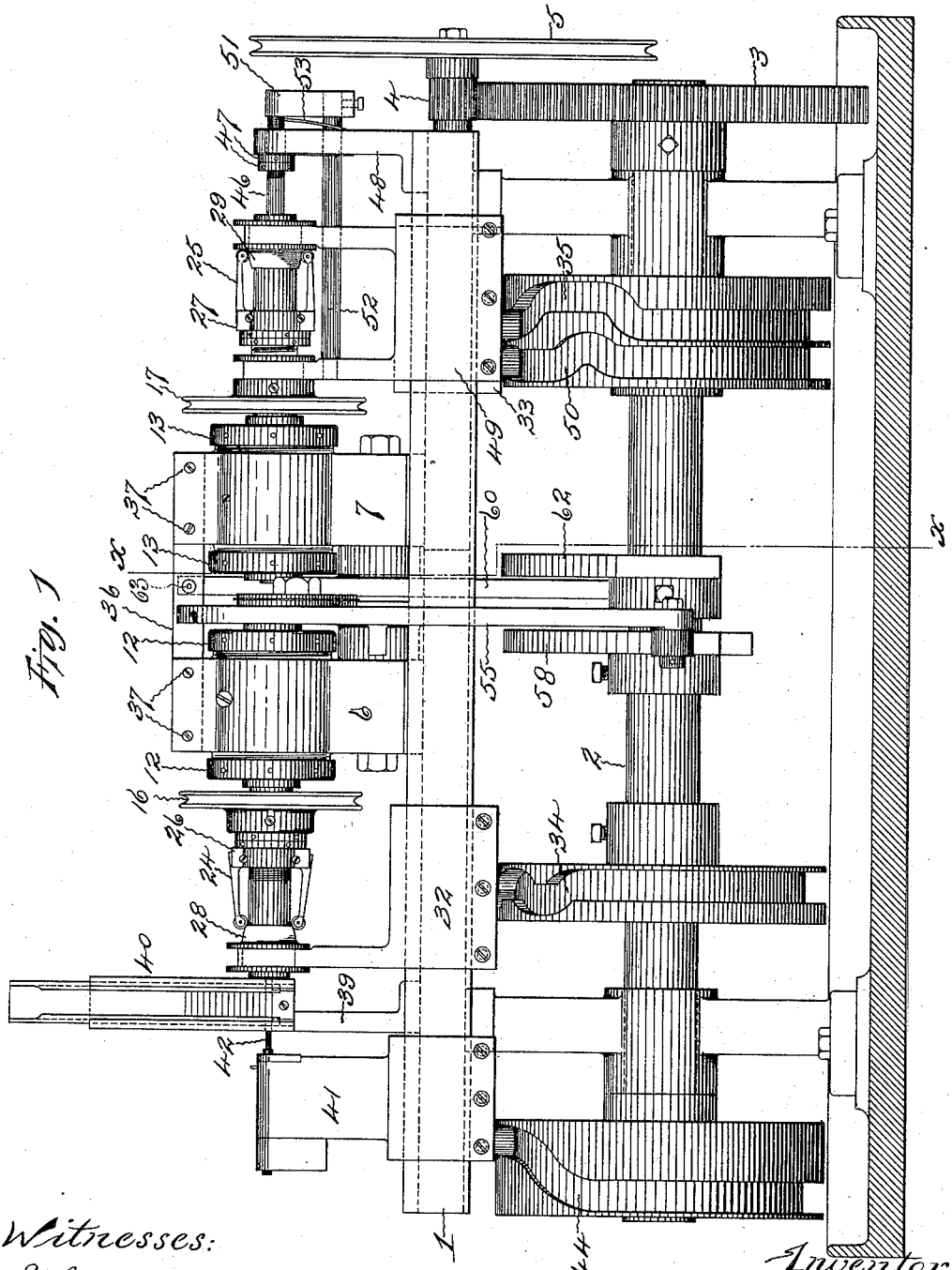

(No Model.) 4 Sheets—Sheet 1.

A. I. JACOBS.
STUD TURNING MACHINE

No. 585,764. Patented July 6, 1897.

Witnesses:
E. J. Hyde.
C. E. Buckland.

Inventor:
Arthur I. Jacobs
by Harry R. Williams
Atty.

(No Model.)  4 Sheets—Sheet 2.
A. I. JACOBS.
STUD TURNING MACHINE.
No. 585,764.  Patented July 6, 1897.
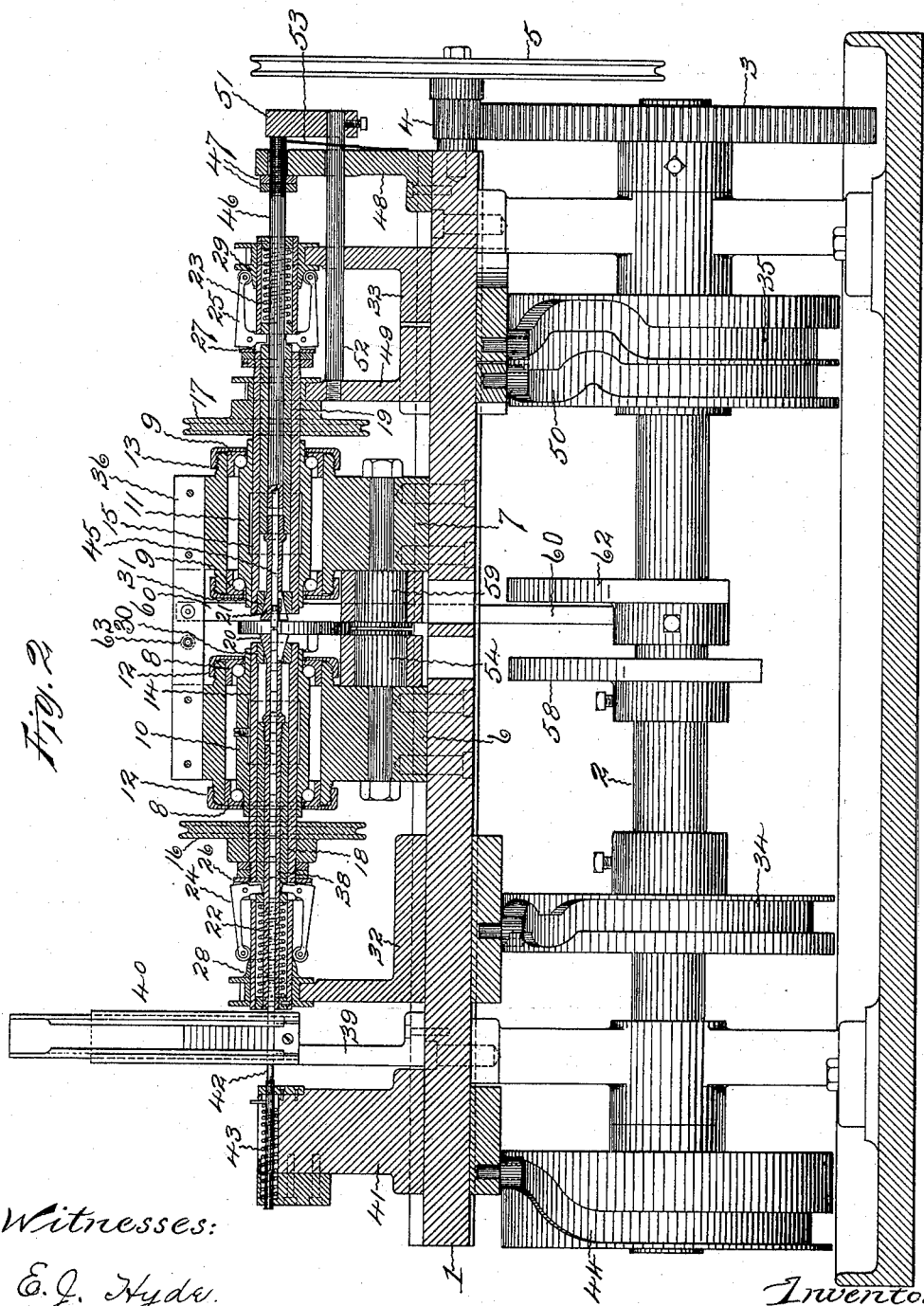
Witnesses:
E. J. Hyde.
C. E. Buckland.
Inventor:
Arthur I. Jacobs, by
Harry R. Williams
atty.

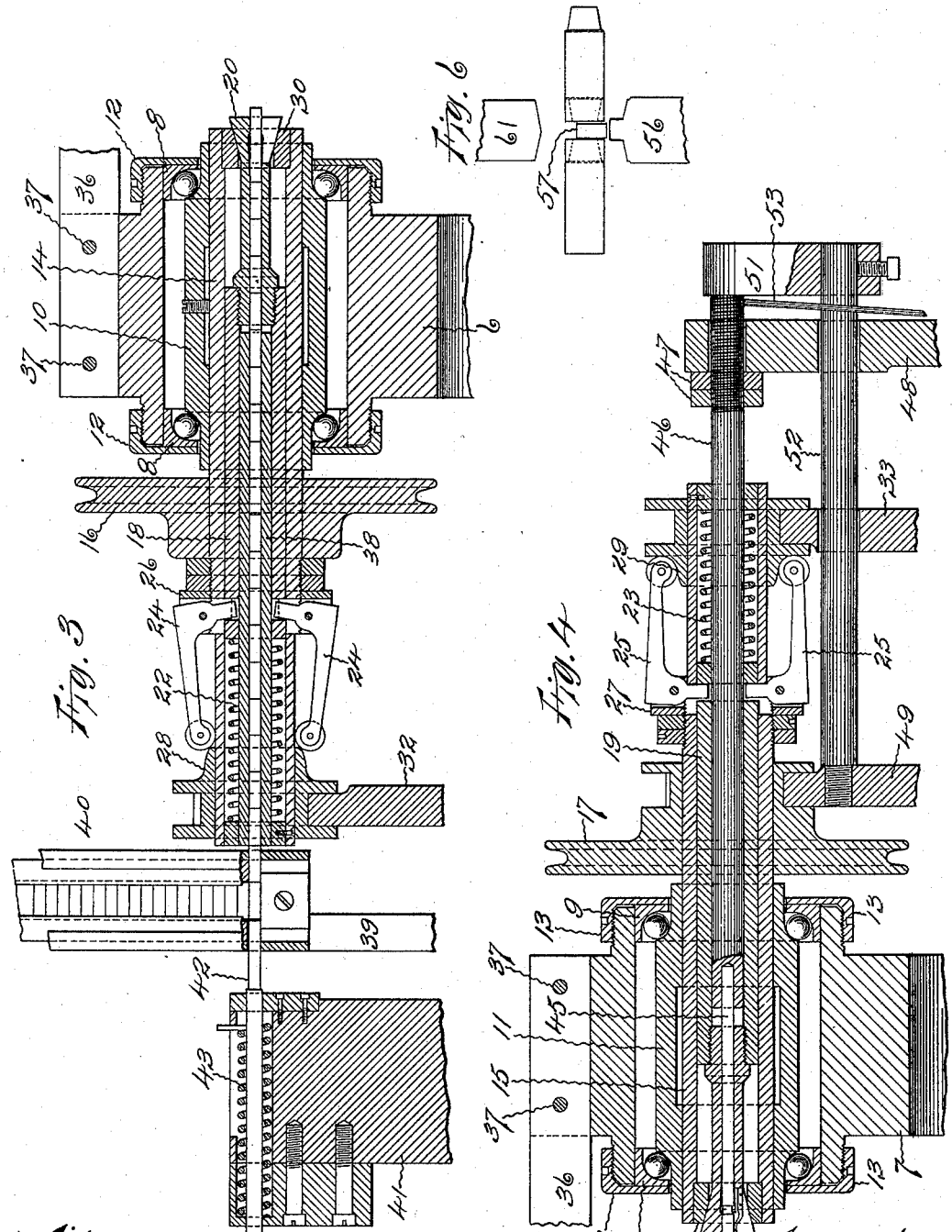

(No Model.) 4 Sheets—Sheet 4.
A. I. JACOBS.
STUD TURNING MACHINE.
No. 585,764. Patented July 6, 1897.
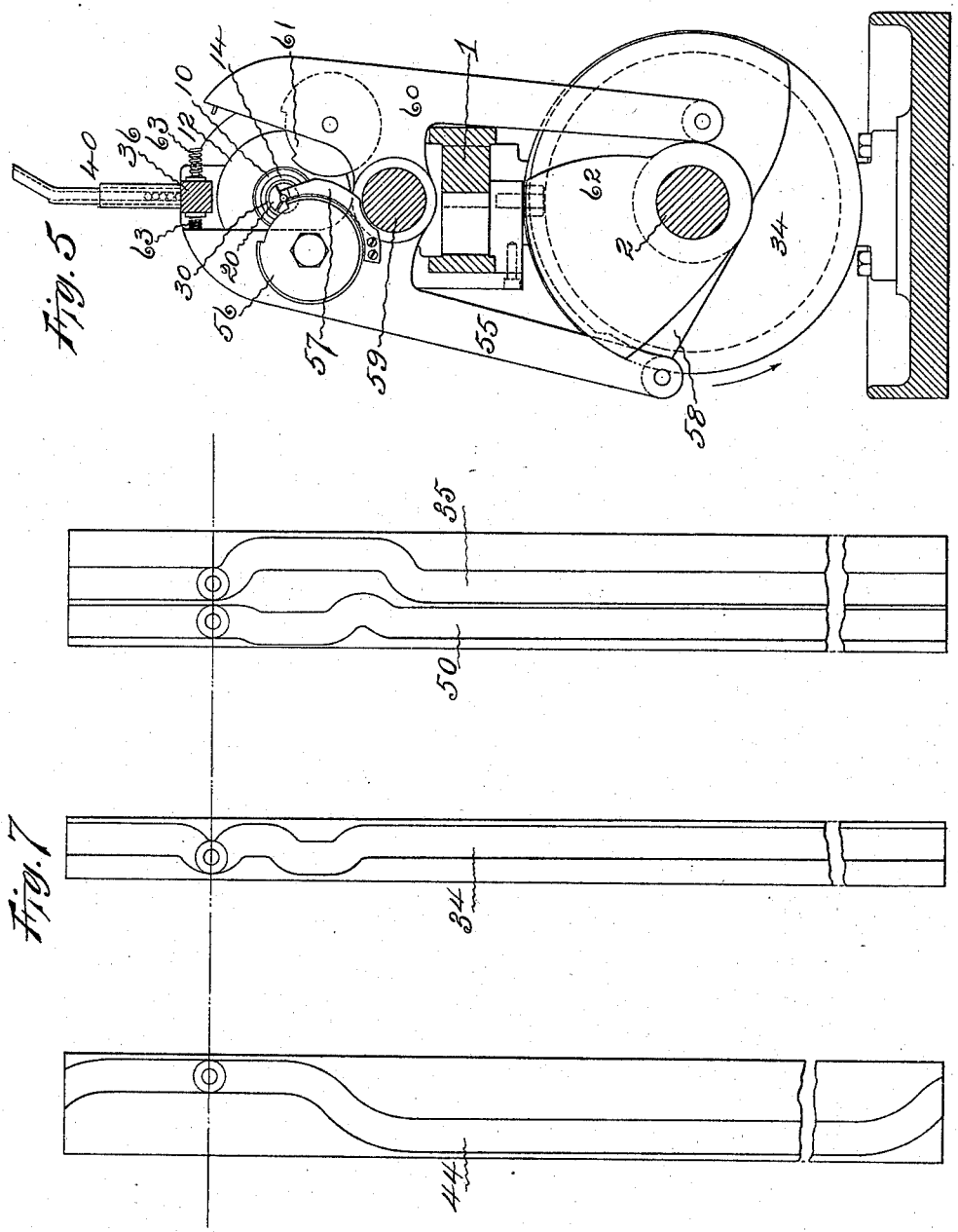
Witnesses:
E. J. Hyde.
C. E. Buckland.
Inventor:
Arthur I. Jacobs,
by Harry R. Williams
atty.
THE NORRIS PETERS CO., PHOTO-LITHO., WASHINGTON, D. C.

UNITED STATES PATENT OFFICE.

ARTHUR I. JACOBS, OF HARTFORD, CONNECTICUT, ASSIGNOR TO THE POPE MANUFACTURING COMPANY, OF SAME PLACE AND PORTLAND, MAINE.

STUD-TURNING MACHINE.

SPECIFICATION forming part of Letters Patent No. 585,764, dated July 6, 1897.

Application filed November 18, 1896. Serial No. 612,624. (No model.)

*To all whom it may concern:*

Be it known that I, ARTHUR I. JACOBS, a citizen of the United States, residing at Hartford, in the county of Hartford and State of Connecticut, have invented certain new and useful Improvements in Stud-Turning Machines, of which the following is a specification.

The invention relates to a machine constructed to receive and continuously feed to automatically-operated cutters small studs—such studs, for instance, as are used in the manufacture of bicycle sprocket-chains.

The object of the invention is to provide a simple machine which will receive a large number of studs and rapidly and continuously feed them in succession to cutters that will accurately and truly turn down and trim off their ends.

In the machine shown as embodying the invention the studs are placed in a feed-trough, and from this are successively advanced by a feed mechanism to a chuck, which is caused to grasp each stud in turn as it is fed and present it to roughing and finishing cutters, which accurately turn down and trim off the forward end, and after this chuck has loosened its grasp the stud which it held is advanced to another chuck, which is caused to grip and so present the stud to the same cutters that the rear end will be accurately turned down and trimmed off, the cutting of the rear end of the advance stud and the forward end of the next succeeding stud taking place simultaneously, after which the advance stud that has both ends turned down and trimmed off is ejected from the machine, as more particularly hereinafter described, and pointed out in the claims.

Referring to the accompanying drawings, in which a machine embodying the invention is illustrated, Figure 1 is a front elevation. Fig. 2 is a vertical longitudinal section. Fig. 3 is an enlarged longitudinal section of the spindle, chuck, and feed mechanisms on the left-hand side of the machine. Fig. 4 is an enlarged section of similar mechanisms on the opposite side of the machine. Fig. 5 is a transverse section on plane denoted by the broken line X X of Fig. 1. Fig. 6 is a detail enlarged view of two studs and the ends of the cutters, and Fig. 7 shows developments of the cams which direct the movements of the mechanisms.

Extending longitudinally of the machine beneath the bed 1 is a shaft 2, that bears the cams, which at the proper times cause the movements of the various mechanisms. On one end of this shaft is a gear 3, and meshing with this gear is a pinion 4, that is mounted upon a spindle with a driving-pulley 5. This pulley is adapted to be belted to any convenient source of power, and when it is driven the shaft is rotated and the cams revolved.

Attached to the upper face of the bed are blocks 6 7, in recesses in which are ball-cases 8 9, and supported upon balls in these cases are sleeves 10 11. The cases are preferably held in position by caps 12 13, arranged in such manner that by screwing the caps on or off the threaded portions of the blocks the cases and balls can be adjusted to insure proper antifriction-bearings for the sleeves.

In the sleeves are hollow spindles 14 15, which bear pulleys 16 17, adapted to be belted to any convenient source of power. When the pulleys are driven, the spindles and sleeves, with the parts that they bear, rotate upon the antifriction-balls. Held in the hollow spindles are tubular chuck-shanks 18 19, which bear chucks 20 21. The chuck-shanks are thrust forward by springs 22 23 and are adapted to be forced backward by the ends of the angle-levers 24 25, that are supported by collars 26 27, adjustably mounted upon the spindles. The outer ends of these levers are adapted to be opened by the engagement of the wedge-blocks 28 29. The springs thrust the chucks forward in such manner that the tapering ends of the spring-fingers are disengaged from the beveled walls of the blocks 30 31, located in the ends of the spindles, but when the wedge-blocks oscillate the levers the chucks are drawn back, so that the engagement of the tapering portions of the spring-fingers with the walls of the blocks in the spindles will cause the spring-fingers to be closed and grasp any stud that is between them.

The wedge-blocks are moved forward for oscillating the levers, so as to cause the chuck-fingers to be closed, and backward to allow the chuck-fingers to be opened by the reciprocation of slides 32 33, that are connected with the wedge-blocks, and these slides are reciprocated upon the bed by the engagement of projecting rollers with the grooves of the cams 34 35 on the main shaft.

Although the blocks 6 7 are securely attached to the upper face of the bed of the machine, their tops are joined by a stiff bar 36. This bar is held in place by screws 37 in such manner that should either of the chucks be slightly out of line or should not hold the studs quite accurately the screws on the necessary side can be adjusted so as to slightly spring the block that is not true, and thus bring the chucks into the correct alinement.

Within the tubular chuck-shank 18 is placed a feed-tube 38, having a bore of approximately the size of the studs to be turned, and supported by an arm 39, rising from the top of the bed near the slide 32, is a feed-trough 40. This feed-trough has an opening through its lower end opposite the bore of the tube 38, and supported opposite this opening by a slide 41 is a feed-rod 42.

The feed-rod is held forward in a socket in the slide by a spring 43, and the slide is reciprocated upon the upper face of the bed by the engagement of a projecting roll with the groove of the cam 44.

Within the tubular chuck-shank 19 is a gage-rod 45. This rod has a shank 46, and the threaded end of the shank is provided with adjusting and clamping nuts 47, adjacent to the supporting-bracket 48, that is secured to the bed.

The spindle 14 rotates with the sleeve 10, but does not reciprocate, while the spindle 15, that rotates with the sleeve 11, is given a reciprocation independently of the sleeve by the slide 49, that is moved by the engagement of a projecting roll with the groove of the cam 50. The rod 46 is loose in the tubular chuck-shank 19 and is engaged by a block 51, connected with a rod 52, attached to the slide 49. A spring 53 engages with the rod 46, so as to normally draw it backward.

Pivoted to a shaft 54, held by the block 6, is a lever 55, which bears a cutter 56 and a gage-plate 57. This lever is adapted to be oscillated to bring the cutter up to a stud by the engagement of a roll on its end with a cam 58.

Pivoted on a shaft 59, held by the block 7, is a lever 60, which bears a cutter 61, and this lever is adapted to be oscillated to bring this cutter up to a stud by the engagement of a roll on its end with a cam 62. Both levers are adapted to be thrust backward from the work by springs 63, that are supported by the bar 36, that joins the tops of the blocks 6 7.

The studs to be turned are put into the feed-trough, and the lower one, when the machine is in operation, is pushed out by the feed-rod 42 as the slide 41 is moved forward by its cam. This is repeated until the feed-tube is filled and the first stud is stopped by the gage-plate 57. With these studs crowded up by the thrust of the spring of the feed-rod the chuck 20, which is rapidly rotating, is tightened by the forward movement of the slide 32, so as to grasp and hold the front stud while the cutter 56, which is shaped as shown in Fig. 6, is brought up by its cam-oscillated lever into engagement with the front end of the stud to roughly turn it down and at the same time trim off its end. After the roughing-cutter has completed its operation and is withdrawn the cutter 61 is brought up by its cam-oscillated lever to finish the cutting. While the cutters are operating, the feed-slide is drawn backward and another stud drops in front of the feed-rod, and when the cutters have finished the spindle 15 is slightly withdrawn, with its chuck 21 open, and then, with its chuck still open, is moved forward by its cam-operated slide, so as to nearly bridge the space between the two spindles. At the same time the feed-slide is again started forward, but as the chuck 20 is still closed and the studs cannot be fed the feed-rod is held back and its spring made tense. When the space between the two chucks is bridged and the feed-slide has moved forward sufficiently, the chuck 20 is allowed to open and release the stud which it holds, and then all of the studs in the feed-tube are thrust forward by the feed-spring and the forward stud, with its front end turned and trimmed, is received by the chuck 21 and located by the gage-rod 45. The chuck 20 is then again closed to grip the stud that is fed to it, and at this time the spindle 15 is drawn back by the cam-reciprocated slide 49. This spindle in its backward movement carries the gage-rod until its shank is stopped by the engagement of the nuts 47 with the bracket 48, and then as the spindle moves farther the stud is drawn back by the friction of the clutch-fingers closely against the end of the gage-rod and located in correct position for the chuck-jaws to grasp it when again closed. After the gage-plate has been brought between the chucks the chuck 20 is opened, allowing the feed-spring to crowd the studs forward and set the end of the stud in the chuck 20 against the gage-plate, in which correct position it is again grasped by the chuck 20 and held while being turned. The chuck 21 is then closed, so as to grasp the stud and cause it to rapidly rotate while the roughing-cutter 56 is brought up to turn down and trim off the rear end of the front stud and the finishing-cutter 61 is brought up to complete the cut of this end.

The operations are so timed that the cutters will operate upon the rear end of the advance stud and the front end of the following stud simultaneously, as indicated in Fig. 6. The stud that is to have its front end turned down and trimmed off is located in position by being thrust into engagement with the gage-plate 57, while the stud that is to have its rear end turned down and trimmed off is located in position by the gage-rod 45. After the cutting of the advance stud is completed on both ends the chuck 21 is loosened and the spindle 15 drawn backward, while the gage-rod remains stationary, which action discharges the completed stud from the chuck 21.

With this machine the studs can be very rapidly fed and accurately located, so that the back end of one and the front end of the next are cut at the same time, which permits of the turning down and trimming off of a large number of studs in a short space of time with but little attendance.

I claim as my invention—

1. In a machine for turning studs, in combination, a bed, a cutter movably mounted upon the bed, a chuck rotarily mounted upon the bed on each side of the cutter, means for opening and closing the chucks, a gage-plate movable between the chucks, a gage-rod located within and movable independently of one of the chucks, and a mechanism adapted to feed successive studs to one chuck when the gage-plate is between the chucks and then when the gage-plate is removed from between the chucks to the other chuck in which they are located by the gage-rod, substantially as specified.

2. In a machine for turning studs, in combination, a bed, a cutter movably mounted upon the bed, a chuck rotarily mounted upon the bed on each side of the cutter, means for opening and closing the chucks, a gage-plate movable between the chucks, a gage-rod located within and movable independently of one of the chucks, and a slide with a yieldingly-supported rod that is adapted to feed the successive studs to one chuck when the gage-plate is between the chucks and then when the gage-plate is removed from between the chucks to the other chuck in which they are located by the gage-rod, substantially as specified.

3. In a machine for turning studs, in combination, a bed, a cutter movably mounted upon the bed, a chuck rotarily mounted upon the bed on one side of the cutter, means for opening and closing this chuck, an automatically-movable gage-rod held in the shank of this chuck, a chuck rotarily mounted upon the bed on the other side of the cutter, means for opening and closing this latter chuck, and a mechanism adapted to feed successive studs first to one chuck and then to the other chuck, substantially as specified.

4. In a machine for turning studs, in combination, a bed, a cutter movably mounted upon the bed, stationary bearing-blocks secured to the bed on each side of the cutter, a non-reciprocating spindle rotarily supported by one of the blocks, a reciprocating spindle rotarily supported by the other of the blocks, chucks borne by both of the spindles, means for opening and closing the chucks, a gage-plate movable between the chucks, a gage-rod located within and movable independently of one of the chucks, and a mechanism adapted to feed successive studs first to one chuck when the gage-plate is between the chucks and then when the gage-plate is removed from between the chucks to the other chuck in which they are located by the gage-rod, substantially as specified.

5. In a machine for turning studs, in combination, a bed, bearing-blocks secured to the bed, a pair of levers pivotally supported by the blocks, cutters mounted upon the levers, a gage-plate borne by one lever, a chuck rotarily supported by each of the bearing-blocks, means for opening and closing the chucks, and a mechanism adapted to feed successive studs first to one chuck and then to the other chuck, substantially as specified.

6. In a machine for turning studs, in combination, a bed, a lever pivotally mounted upon the bed, a cutter and a gage-plate borne by the lever, means for oscillating the lever, a chuck rotarily mounted upon the bed on each side of the cutter, means for opening and closing the chucks, a mechanism adapted to feed successive studs first to one chuck and then to the other chuck, and an independently-movable gage-rod held by the shank of one of the chucks, substantially as specified.

7. In a machine for turning studs, in combination, a bed, a cutter movably mounted upon the bed, a chuck rotarily mounted upon the bed on each side of the cutter, means for opening and closing the chucks, a mechanism adapted to feed successive studs first to one chuck and then to the other chuck, and a gage-plate adapted to be intermittently moved between the chucks, substantially as specified.

8. In a machine for turning studs, in combination, a bed, a cutter movably mounted upon the bed, stationary bearing-blocks secured to the bed on each side of the cutter, a non-reciprocating rotary spindle supported by one of the blocks, a reciprocating spindle rotarily supported by the other of the blocks, chucks borne by and movable with both of the spindles, means for opening and closing the chucks, a gage-plate movable between the chucks, a mechanism adapted to feed successive studs first to the chuck in the non-reciprocating spindle and then to the chuck in the reciprocating spindle, a gage-rod having a limited movement within the chuck in the reciprocating spindle, and means for reciprocating this latter spindle independently of the gage-rod, substantially as specified.

9. In a machine for turning studs, in combination, a cutter movably mounted upon the bed, bearing-blocks attached to the bed on each side of the cutter, a non-reciprocating spindle rotarily supported by one of the blocks, a reciprocating spindle rotarily supported by the other of the blocks, chucks borne by and movable with both of the spindles, means for opening and closing the chucks, a mechanism adapted to feed successive studs first to the chuck borne by the non-reciprocating spindle and then to the chuck borne by the reciprocating spindle, and a gage-rod having a limited independent movement within the chuck borne by the reciprocating spindle and connected with the slide that moves the reciprocating spindle, substantially as specified.

10. In a machine for turning studs, in combination, a cutter movably mounted upon the bed, a bearing-block attached to the bed on one side of the cutter, a sleeve rotarily supported by the bearing-block, a spindle with a driving-pulley borne by the sleeve, a chuck longitudinally movable within the spindle, levers borne by the spindle and adapted to engage the chuck-shank, a wedge-block connected with a slide for oscillating the levers, a feed-tube located within the chuck-shank, a feed-trough with an opening near its lower end adjacent to the bore of the feed-tube, a feed-rod supported in line with the opening through the trough, and a slide adapted to reciprocate the feed-rod, substantially as specified.

11. In a machine for turning studs, in combination, a cutter movably mounted upon the bed, a bearing-block attached to the bed on each side of the cutter, a sleeve rotarily supported by each block, a spindle with a driving-pulley borne by each sleeve, a chuck longitudinally movable within each spindle, a pair of levers borne by each spindle and adapted to engage with the chuck-shanks, a wedge-block connected with a slide for reciprocating each pair of levers, a feed-tube located within one of the chuck-shanks, a feed-trough with an opening near its lower end adjacent to the bore of the feed-tube, a feed-rod supported in line with the opening through the trough, a slide adapted to reciprocate the feed-rod, a gage-rod located in the other of the chuck-shanks, and a slide adapted to reciprocate the gage-rod, substantially as specified.

ARTHUR I. JACOBS.

Witnesses:
H. R. WILLIAMS,
E. J. HYDE.